United States Patent [19]

Kawada

[11] Patent Number: 4,985,777
[45] Date of Patent: Jan. 15, 1991

[54] CAMERA HAVING A FOCUS CONTROLLER CAPABLE OF FOCUSING IN HORIZONTAL AND VERTICAL DIRECTIONS OF AN IMAGE

[75] Inventor: Yukihiro Kawada, Tokyo, Japan

[73] Assignee: Fuji Photo Film Co., Ltd., Tokyo, Japan

[21] Appl. No.: 366,852

[22] Filed: Jun. 15, 1989

[30] Foreign Application Priority Data

Jun. 17, 1988 [JP] Japan .................................. 63-147992
Nov. 8, 1988 [JP] Japan .................................. 63-280304

[51] Int. Cl.$^5$ .......................................... H04N 5/232
[52] U.S. Cl. .................................................... 358/227
[58] Field of Search ................. 358/227, 225, 224, 909

[56] References Cited

U.S. PATENT DOCUMENTS 4,599,653  7/1986  Kimura et al. ...................... 358/227
4,680,639  7/1987  Isono et al. .......................... 358/227
4,739,395  4/1988  Johanndeiter et al. ................ 358/37

Primary Examiner—Stephen Brinich

[57] ABSTRACT

In a focus control apparatus of a camera, a luminance signal component having a relatively high frequency is extracted from a video signal by use of a filter so as to accumulate the extracted luminance signal component by an accumulator. A difference circuit computes a difference in the accumulated signal component between two adjacent horizontal scanning lines such that the maximum value of the difference is held by an accumulator unit for a vertical scanning period. The focus of the lens is controlled such that the accumulated value produced by the accumulator unit takes the maximum value. A high focusing accuracy is obtained not only for an image in which the luminance greatly varies in the horizontal direction of the image having a vertical stripe pattern but also for an image associated with a large change only in the vertical direction having an image of vertical stripes.

15 Claims, 15 Drawing Sheets

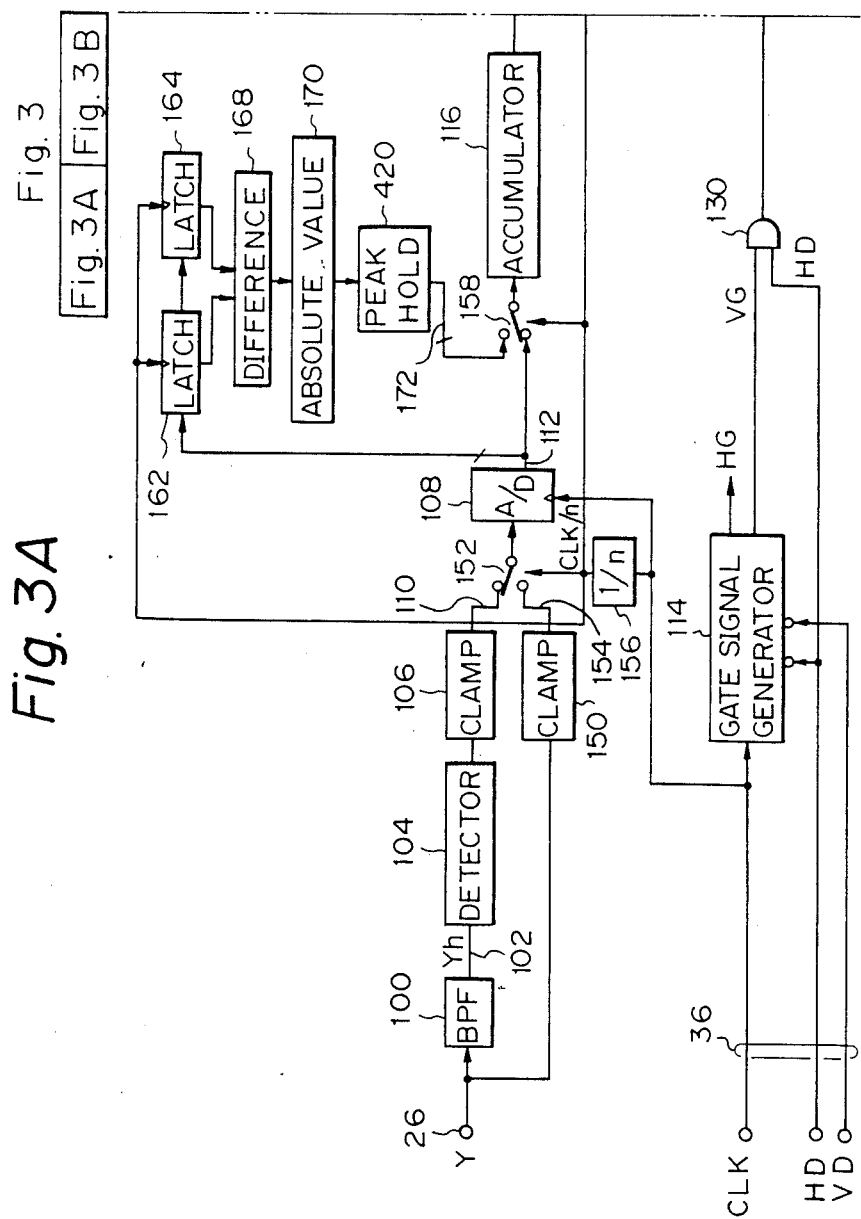

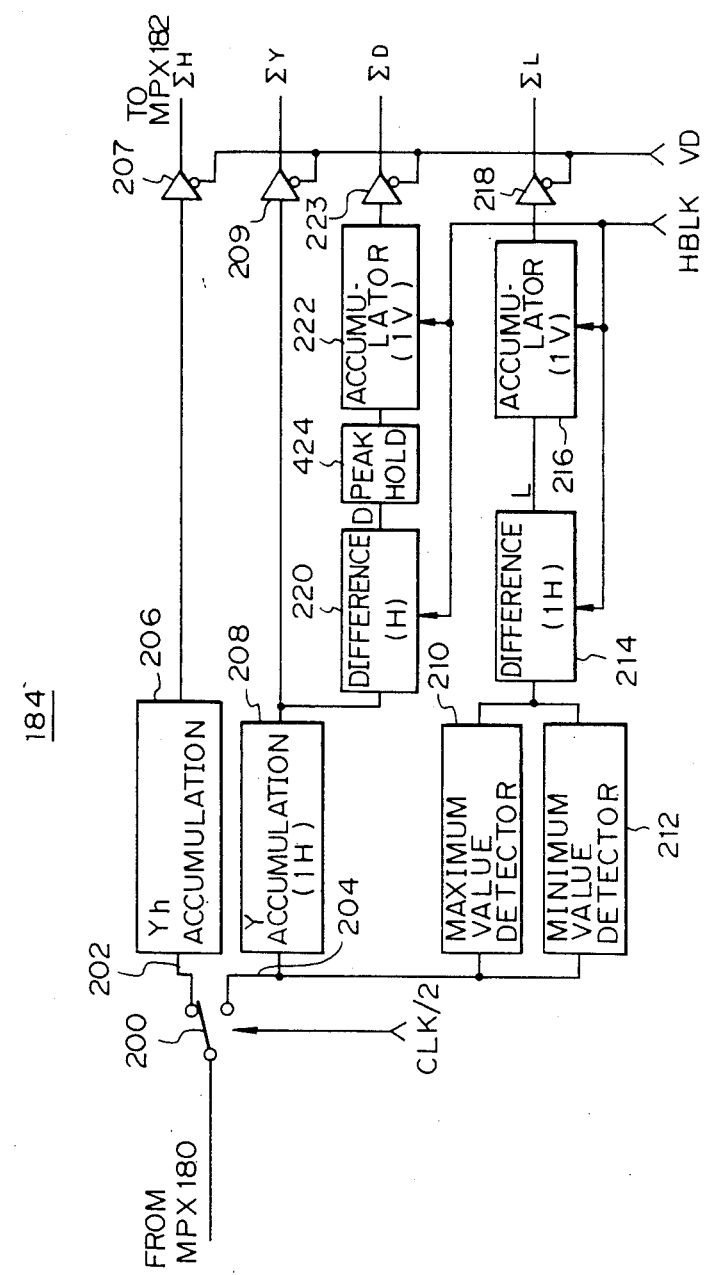

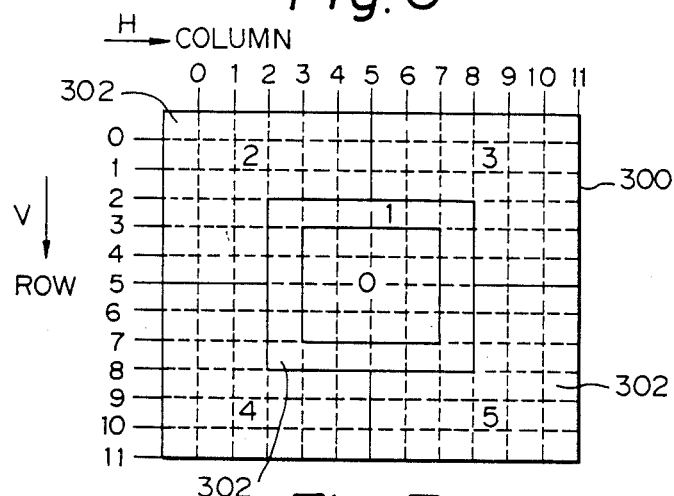

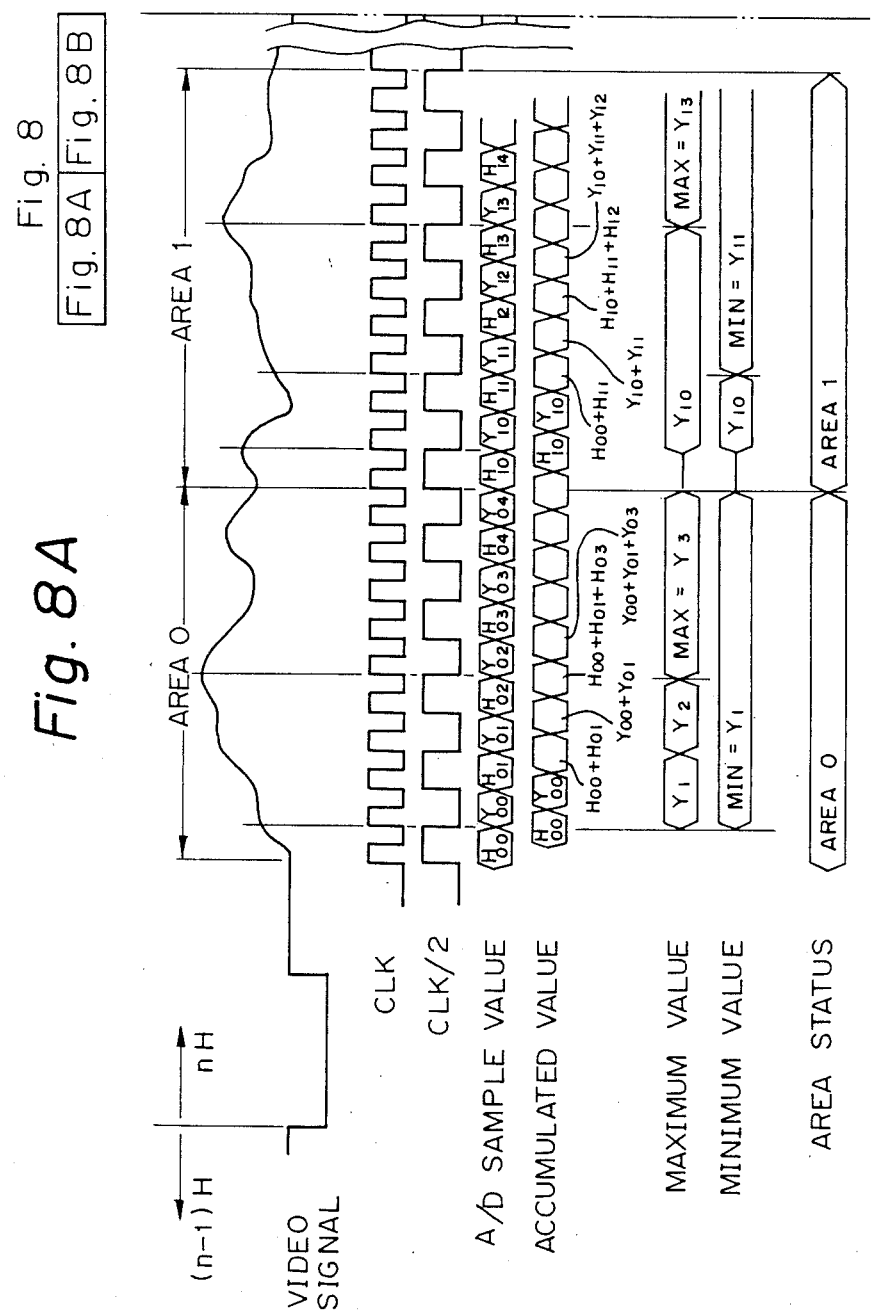

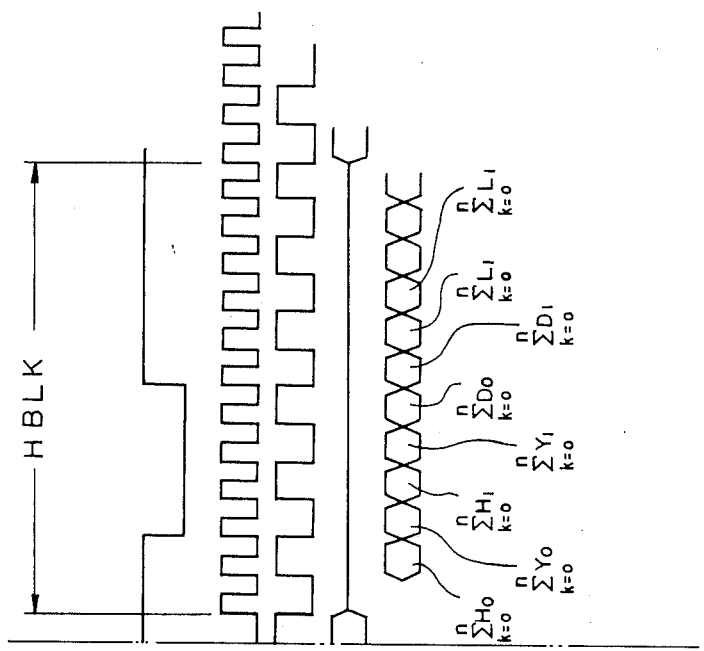

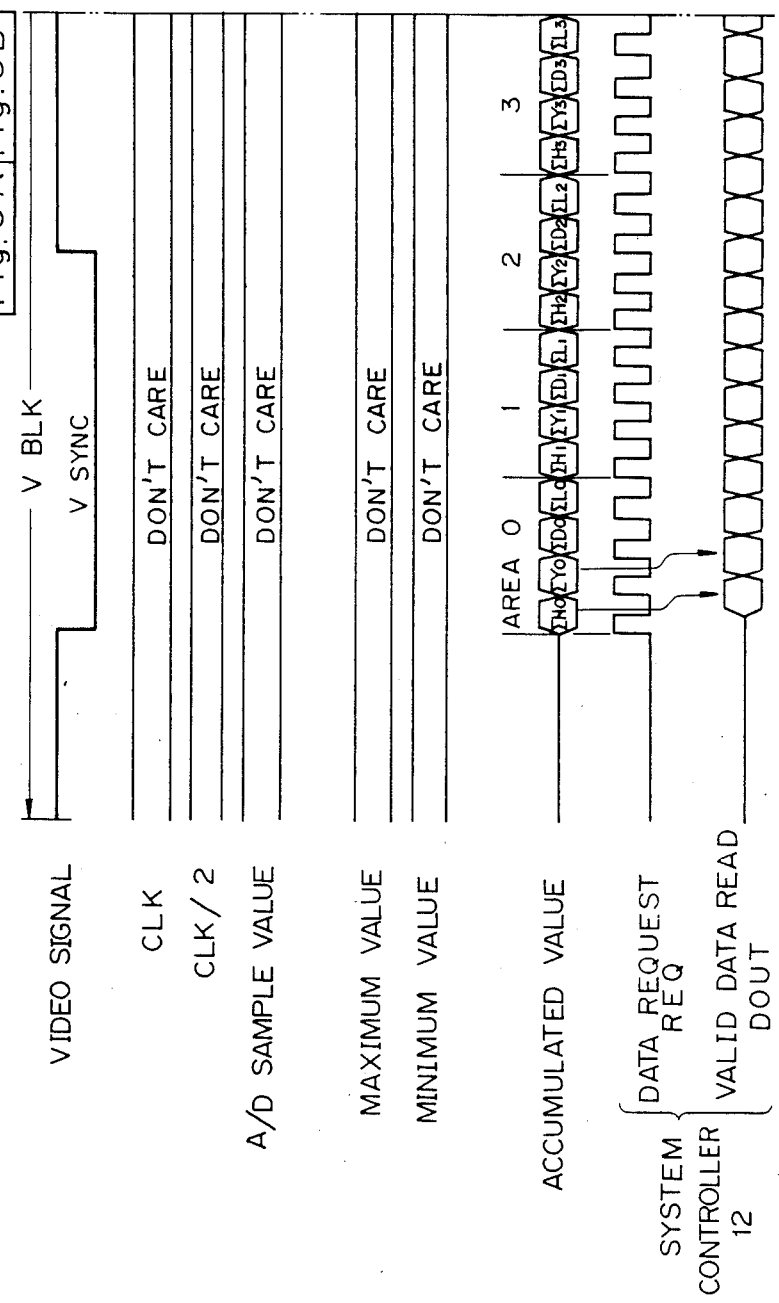

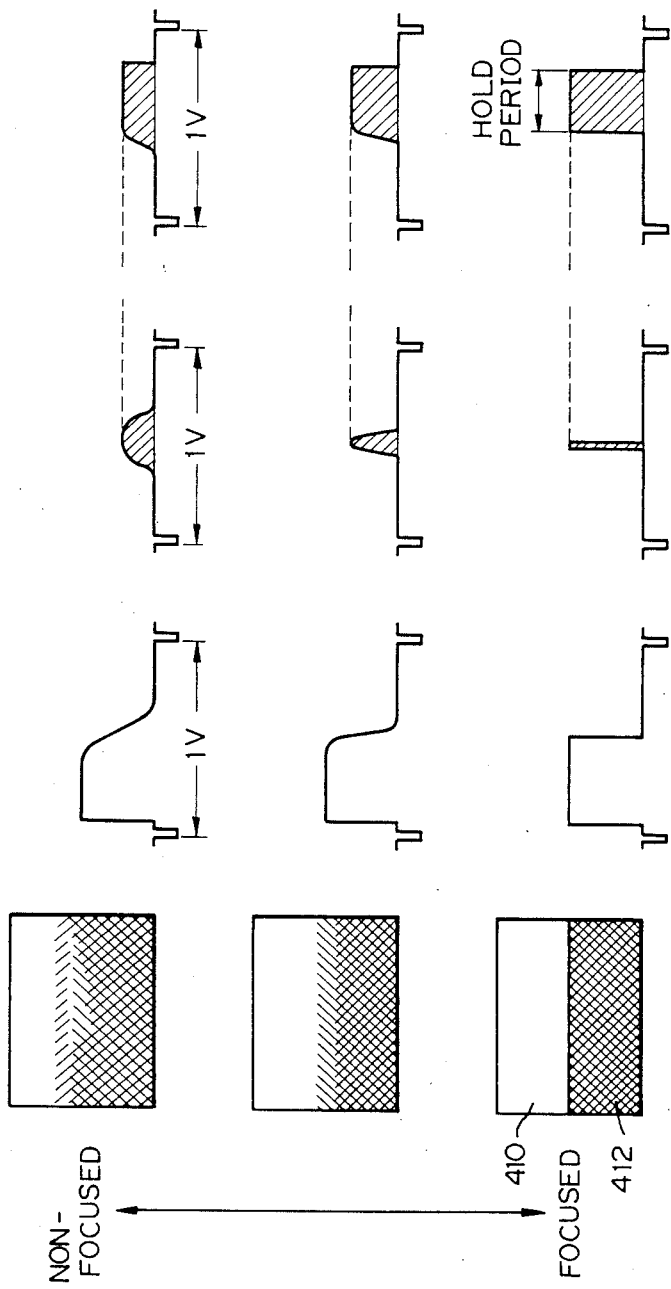

CAMERA HAVING A FOCUS CONTROLLER CAPABLE OF FOCUSING IN HORIZONTAL AND VERTICAL DIRECTIONS OF AN IMAGE

BACKGROUND OF THE INVENTION

1. Field of the Invention

The present invention relates to a camera, and in particular, to a focus controller for focusing an imaging lens by use of a video signal attained from an imaging device.

2. Description of the Related Art

In conventional focus controllers, there has been employed a high frequency detection focus control method in which components of a video signal having a relatively high frequency are used such that the integrated value thereof develops the maximum value and effects the control to focus an imaging lens. Since the high frequency components are extracted from a horizontal scanning line of a video signal in this method. A characteristic of a satisfactory focusing precision is obtained for a pattern or design containing high freqeuncy components in the horizontal direction of the image, such as a pattern of vertical stripes.

In actual cases, there exist various objects ranging from objects having an obscure contour to objects having a clear contour. For a pattern with a clear contour, a large portion of a video signal attained by imaging the pattern is occupied by a high frequency component; and such a large high frequency component cannot be necessarily attained in a case of a pattern having an obscure contour. For a pattern of vertical stripes including clear white and black stripes shown as an example of the former case in FIG. 10A, when an imaging system is focused onto this object, there is attained a luminance signal Y of a rectangular shape as shown in FIG. 10B. When the luminance signal Y becomes similar to an ideal rectangular wave, the higher harmonic spectra thereof are increased. As a result, there is developed a frequency charateristic of FIG. 10D in which the frequency (f)—gain (g) characteristic is indicated by a solid line 400. When the focusing is not appropriately effected onto the object, the luminance signal Y becomes to be a waveform having a small harmonic component as shown in FIG. 10C. As a consequence, the frequency band thereof shifts toward a low frequency zone like a curve 402 of FIG. 10D. In this situation, although the fundamental or dominant wave greatly varies depending on the number of white and black stripes in the screen, if the video signals of the screen include even one impulse component, a focused state can be obtained in a relatively easy manner, for example, by use of a peak detection.

However, this conventional focus control method has a disadvantage that a high focusing accuracy cannot be developed for a pattern in which the luminance of the screen alters through an intermediate gradation. For example, in the case of an object as shown in FIG. 11A where a single light is irradiated onto a surface of a wall slightly having a wave-like contour along a horizontal direction H and there does not exist a reflective image due to a reflection, a luminance signal obtained from this object develops a waveform having a small harmonic wave component even in the focused state as shown in FIG. 11B. If this is an ideal sine or sinusoidal wave, an electric power spectra thereof naturally includes only the fundamental wave as shown in FIG. 11D, namely, the wave cannot be expected to obtain a high frequency component. In a state other than the focused state, as shown in FIG. 11C, only a slight frequency variation of the fundamental wave and a variation in the amount of the fundamental component appears.

In addition, the conventional focus control method has been attended with a disadvantage that a high focusing accuracy cannot be obtained also for a pattern in which the luminance is greately changed only in the vertical direction of the screen. In more detail of the video signal, a lower frequency, for example, a field frequency of 60 Hz is used for the scanning operation in the vertical direction. As a consequence, in the case where there exists only one line associated with the video signal in which a relatively large change takes place in the luminance along the vertical direction of the image, the change appears only in the fundamental wave of the field frequency so as to develop a component of a lowest frequency. Consequently, in a circuit above controlling the focusing operation by extracting the high frequency component, it has been impossible to effectively use such a low frequency component.

For example, as shown in FIG. 12A, in the case of a pattern of a horizontal design associated with an abrupt change in the gradation of the white and black along the vertical direction V, the high frequency component described above cannot be obtained in the video signal. This is because that the scanning is repeatedly achieved for the video signal in the horzontal direction H of the screen and hence the gradation change in the vertical direction V appears only in the dominant wave of the field frequency. As consequence, in the focused state, a focus detection signal is obtained as a luminance variation astriding two lines adjacent to each other as shown in FIG. 12B. In contrast, when the lens is not set to the focused state, as shown in FIG. 12C, the luminance variation gradually occurs through several horizontal scanning lines. Consequently, the frequency as an object of the focus control is completely different from the frequency in the case where the pattern including hrozontal stripes, and hence the focus control processing cannot be effected by use of the conventional focus controller. As described above, it has been impossible for the conventional focus controller to accomplish a sufficient focus control on an object associated with a luminance change in the vertical direction of the screen.

SUMMARY OF THE INVENTION

It is therefore an object of the present invention to provide a focus controller and a camera in which an efficient focus control can be achieved as in the case of an object associated with a luminance change in the horizontal direction for an object associated with a luminance change only in the vertical direction of the screen, for example. Thereby, the disadvantages of the conventional technology are eliminated.

According to the present invention, there is provided a focus controller of a camera including filter means for extracting a luminance signal component of a relatively high frequency from a luminance signal of a video signal representing an object field shot by a lens, first accumulating means for accumulating the extracted luminance signal component with respect to a horizontal scanning line of the video signal, differentiating means for attaining a difference between two luminance signal components respectively accumulated for two horizontal scanning lines, second accumulating means for accumulating a value associated with the difference of which a maximum value is held for a predetermined period of time associated with at least a portion of a vertical scanning period of the video signal, and control means for producing a control signal which controls the lens to be focused so as to set an accumulated value delivered from said second accumulating means to a maximum value.

In addition, the camera having the focus controller comprises imaging means including a lens for shooting an object field by use thereof to produce a video signal to be supplied to the filter means and focusing means for controlling the focus of the lens of the imaging means depending on the control signal.

The focus controller of the camera according to the present invention further includes filter means for extracting a luminance signal component of a relatively high frequency from a luminance signal of a video signal representing an object field shot by a lens, accumulating/differentiating means for accumulating the extracted luminance signal component with respect to a horizontal scanning line of the video signal and for attaining a difference between two luminance signal components respectively accumulated for two horizontal scanning lines, first accumulating means for accumulating a value associated with the difference of which a maximum value is held for a predetermined period of time associated with at least a portion of a vertical scanning period of the video signal, second accumulating means for extracting a luminance signal component having a relatively low frequency so as to accumulate a value of the signal component for which a maximum value of a variation thereof is held for a predetermined period of time, and control means for producing a control signal which controls the lens to be focused so as to set an accumulated value delivered from said second accumulating means to a maximum value.

In addition, the focus controller of the camera according to the present invention inlcudes filter means for extracting a luminance signal component having a relatively high frequency from a luminance signal of a video signal representing an object field shot by use of a lens, timing generating means for generating a control signal specifying a predetermined area of a screen displayed with a video signal in synchronism with a scanning thereof, arithmetic means for accumulating the luminance signal component associated with the associated predetermined area with respect to a horizontal scanning line of the video signal so as to accumulate a difference between a maximum value and a minimum value of the luminance signal in the horizontal line with respect to a vertical scanning, selecting means operative in response to a control signal so as to selectively supply the luminance signal to one of said arithmetic means corresponding to the predetermined area specified by the control signal, and control means for producing a control signal which controls focusig of the lens such that an accumulated value delivered from said one arithmetic means takes a maximum value.

As described above, according to the present invention, the difference between the luminance signal components in a high frequency band is accumulated along the vertical scanning direction of the screen such that the focus control is accomplished to set the accumulated value to a maximum vlaue.

BRIEF DESCRIPTION OF THE DRAWINGS

The objects and features of the present invention will become more apparent from the consideration of the following detailed description taken in conjunction with the accompanying drawings in which:

FIGS. 3A and 3B, when combined as illustrated in FIG. 3, are a functional block diagram similar to FIG. 1 illustrating an alternative embodiment according to the present invention;

FIG. 5 is a functional block diagram illustrating an example of a particular configuration for a procedure circuit in the embodiment of FIG. 4;

FIG. 6 is an explanatory diagram useful to explain an example of a sampling area of a screen adopted in the embodiment of FIG. 4;

FIG. 7 is a schematic diagram illustrating a memory map layout of a gate area code generator of the embodiment of FIG. 4;

FIGS. 8A and 8B, when combined as illustrated in FIG. 8, are a timing chart illustrating an example of a waveform in a horizontal scanning period in the embodiment of FIG. 4;

FIGS. 9A and 9B, when combined as illustrated in FIG. 9, are a timing chart illustrating an example of a waveform in a vertical blanking period in the embodiment of FIG. 4; and FIGS. 10A-10D, FIGS. 11A-11D, FIGS. 12A-12C and FIGS. 13A-13D are explanatory diagrams useful to explain the focus control operations in the conventional technology and according to the present invention.

DESCRIPTION OF THE PREFERRED EMBODIMENTS

Figure 1:
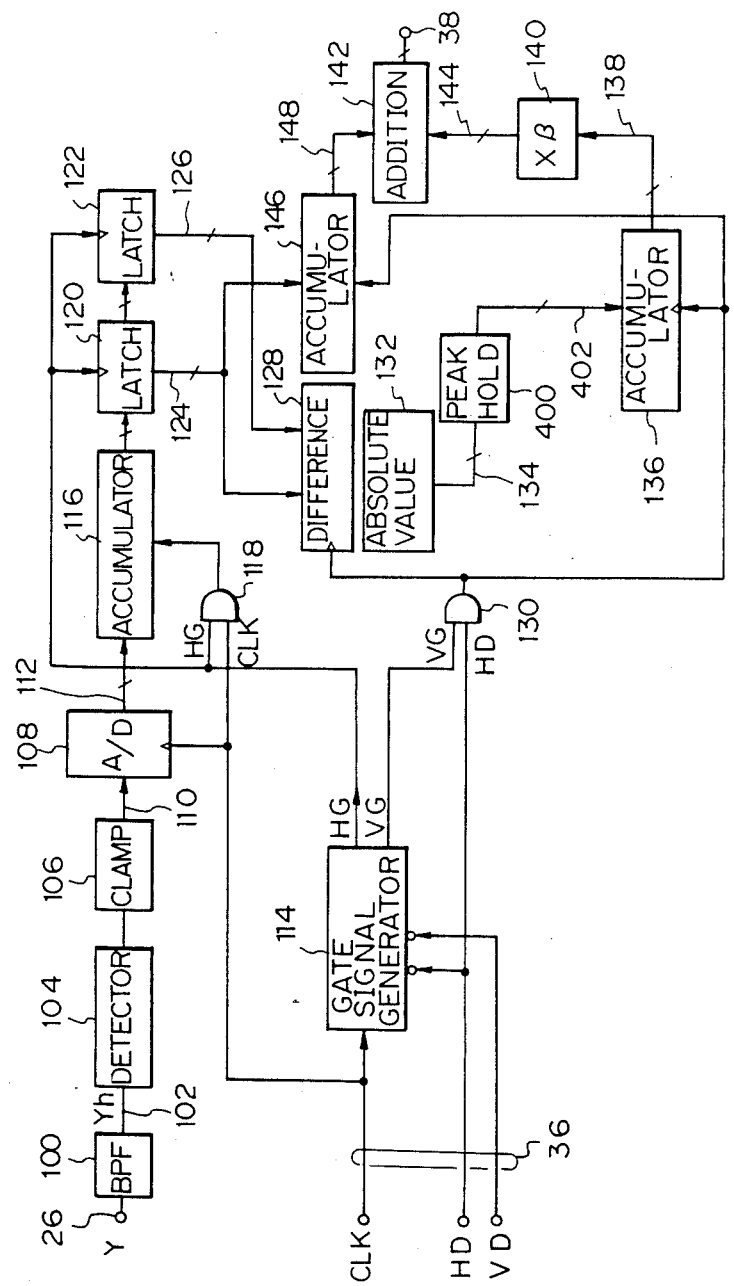
FIG. 1 is a functional diagram schematically illustrating an example of a configuration of a focus control circuit in an embodiment of a focus controller for a camera according to the present invention.

Referring now to the drawings, a description will be given in detail of an embodiment of a focus controller of a camera according to the present invention.

Figure 2:
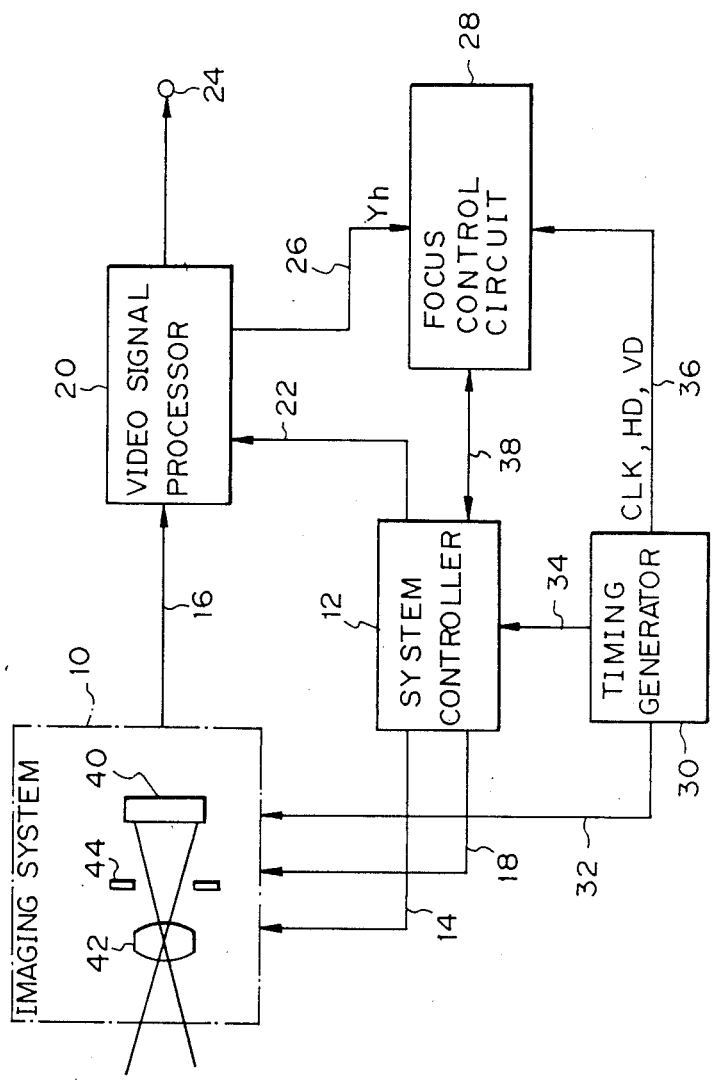
FIG. 2 is a functional block diagram illustrating an embodiment of a focus controller in which the present invention is applied to a camera having an imaging device such as a solid-state imaging device.

FIG. 2 illustrates an embodiment in which the present invention is applied to a camera having an imaging device 40 such as a solid-state imaging device, for example, a video camera and an electronic still camera. This embodiment includes an imaging system 10 having the imaging device 40 and an imaging lens 42 of which the focus is controlled by a system control circuit 12 via a control line 14 such that an object field is shot by the imaging lens 42 so as to supply a video signal representing the object field to an outptut 16. The imaging system 10 further comprises an iris 44 for adjusting an amount of a light incident to the imaging device 40, namely, a size of an optical opening of the iris 44 is controlled by the system control circuit 12 via a control line 18. The imaging system 12 supplies the output 16 to a video signal processing circuit 20.

The video signal processing circuit 20 is a signal processor which receives various synchronization signals via a control line 22 from the system controller 12 so as to produce and to deliver a video signal, for example, conforming to the standard television system to an output 24. The video signal includes a luminance signal Y, which is also supplied to a focus control circuit 28 via a signal line 26.

In this camera, a video signal of a moving picture or a still picture representing an image of an object shot by the imaging system 10 is suplied to the output 24 thereof. The imaging operation is controlled by the system controller 12 in response to various timing signals produced from a timing generator 30, which includes a self-running oscillator, not shown, so as to generate from a clock obtained from the oscillator various timing signals such as a pixel clock CLK for a faster scan of a video signal, a horizontal synchronization signal HD, and a vertical synchronization signal VD. These timing signals are delivered via a control line 32 to the imaging system 10 and via a control line 34 to the system controller 12 and via a control line 36 to the focus controller 28. The system control circuit 12 and the timing generator 30 have various functions required for the operations of this system as a camera including a manual operation input such as a shooting indication so as to generate various timing points. However, these points are not directly related to the understanding of the present invention and hence drawings thereof and description thereabout will be here avoided.

The focus control circuit 28 is a circuit which receives the luminance signal Y from the video signal processor 20 to detect a focus state of the imaging lens 42 and to supply the system controller 12 via a control line 38 with evaluation data as a result of the detection. The system controller 12 controls via the control line 14 a focusing mechanism of the imaging lens 42 by use of the focus evaluation data. In several embodiments of the present invention, which will be described later, the focus control circuit 28 cooperates with the system control circuit 12 so as to effect a focus control in a mountaineering control method based on the luminance signal of the video signal. Furthermore, in an embodiment, the system controller 12 uses the evaluation data attained from the focus controller 28 to control the iris 44 via the control line 18, and to thereby achieve an automatic exposure control.

Referring now to FIG. 1, the focus controller 28 includes a band-pass filter, BPF 100, which is a filter circuit having a band pass of a frequency range, for example, from 400 kHz to 2 MHz so as to extract a luminance signal component having a relatively high frequency from the luminance signal Y attained from the video signal processor 20. The signal component Yh in a high frequency band is supplied to an output 102 of the filter 100 so as to be detected by a detector circuit 104 such that the detected signal is clamped by a clamp circuit 106 and is then fed to an input 110 of an analog-to-digital (A/D) converter 108. The analog-to-digital (A/D) converter 108 samples the luminance signal Yh of the high frequency component at the input 110 in response to a clock delivered from the output 36 of the timing generator 30 so as to convert the signal into data associated therewith, for example, 8-bit digital data, which is then supplied to an output 112 thereof. In FIG. 1, an inclined line intersecting a connecting line indicates that the connecting line is a digital data line operating in a bit parallel fashion.

The output 36 of the timing generator 30 supplies a gate signal generator 114 with the clock CLK, the horizontal synchronization signal HD, and the vertical synchronization signal VD. The gate signal generator 114 is a circuit which generates a horizontal gate signal HG and a vertical gate signal VG from the signals CLK, HD, and VD. Both synchronization signals HD and VG determine timing points respectively in the horizontal and vertical directions so as to define in a raster scanning of a video signal a predetermined sampling area of a screen, for example, a rectangular or circular focus detection area in the neighborhood of a center of the screen.

The analog-to-digital converter 108 supplies from the output 112 thererof a high frequency luminance component Yh in the form of digital data to an accumulator 116. The accumulator circuit 116 receives the clock CLK from an AND gate 118 only for a period in which the horizontal gate signal is significant, namely, a horizontal scanning period associated with the sampling area such that the high frequency luminance component data 112 is accumulated therein in response to the clock CLK. In other words, the accumulator 116 accumulates the luminance component Yh obtained only in a portion of the predetermined area in a horizontal scanning (1 H) period. The accumulated value is sequentially held in two latches 120 and 122 each responsive to the horizontal gate. That is, a high frequency luminance component accumulated in the accumulator 116 for a 1 H period is latched in the first latch 120 in the next 1 H period and is then held in the next latch 122 in the subsequent 1 H period.

The relatively new luminance component data of the high frequency loaded in the latch 120 of the first stage is sent from an output 124 thereof so as to be accumulated for a period of one field (1 V) period in an accumulate circuit 146. The accumulation of the accumulator 146 is achieved and is then reset for each field period in response to a reception of the horizontal synchronization signal HD from an AND gate for a period in which the vertical gate signal VG is significant, namely, for a vertical scanning period associated with the sampling area. The circuit configuration of this portion may be similar to the configuration employed in the conventional focus controller. The accumulator 146 delivers accumulated data 148 of the high frequency luminance component to an input of an adder 142. Simply, if the system control circuit 12 receives the accumulated data 148 of the high frequency luminance component so as to control the focus of the imaging lens 42 such that the accumulated data takes a maximum value, there is developed a high focusing accuracy for an image in which the luminance greatly varies in the horizontal direction of the image.

In this embodiment, in order to further improve the focusing accuracy also for an image in which the luminance greatly varies in the vertical direction thereof, the relatively new high frequency luminance component data is fed via the output 124 and the relatively old high frequency luminance component data held in the latch of the next stage is delivered via an output 126 to a difference circuit 128, which is responsive to the horizontal synchronization signal HD from the AND gate 130 so as to compute a difference between the two high frequency luminance component data 124 and 126 only in a period in which the vertical gate signal VG associated with the sampling area is significant. The difference data is delivered to an absolute value circuit 132, and an absolute value thus obtained is delivered from an output 134 thereof to a peak hold circuit 400. In the peak hold circuit 400, a maximum value of the input 134 in the significant period is held for a predetermined period of time in an updating fashion. The predetermined holding period may be set to a discretionary value. The peak hold circuit 400 has an output 402 which is connected to an accumulator 136 and is driven by the horizontal synchronization signal HD for a vertical period associated with the sampling area so as to accumulate during the pertinent period the difference data obtained from the high frequency luminance component that has undergone the peak hold operation.

As can be seen from the description above, for a predetermined sampling area in a screen or a field, there is obtained a difference between the accumulated values of the high frequency luminance signal components respectively associated with two consecutive horizontal scanning lines such that the absolute value of the difference undergoes a peak hold operation so as to accumulate the resultant value in the vertical scanning direction, thereby obtaining accumulated data at an output 138 of the accumulate circuit 136. That is, the output 138 of the accumulator 136 develops accumulated difference data including an accumulated value of a result obtained by effecting a peak hold operation on an absolute value of the difference of the high frequency luminance component signal of a predetermined sampling area of one field associated with two adjacent horizontal scanning lines. This arithmetic operation is conducted and is then reset for each field (1 V) period. The accumulated difference data of the high frequency luminance component is multiplied by a predetermined weight $\beta$ in a multiplier circuit 140 and the resultant signal is fed to another input 144 of the adder 142. The accumulated difference data of the high frequency luminance component received by the adder circuit 142 is therein added to the accumulated data 148 of the high frequency luminance component such that the resultant data is supplied from the output 38 to the system controller 12. In this situation, if the system control circuit 12 employs the data 138 for the focus control, the focusing precision will be considerably increased for an image in which the luminance greatly varies in the vertical direction of the image.

As can be seen from the description above, the focus control data attained from the output 38 is a sum of the accumulated data 148 of the high frequency luminance component and the data obtained by multiplying the accumulated difference data 144 of the high frequency luminance component by the weight value $\beta$. As a consequence, when the system controller 12 receives the focus control data 38 which controls the focusing operation of the imaging lens 42 such that the focus control data 38 takes a maximum value, there will be developed a high focusing accuracy for an image such as an image including vertical stripes, like in the conventional case, in which the luminance greatly varies in the horizontal direction. Furthermore, the focusing accuracy is increased also for images such images including horizontal stripes in which the luminance greatly varies in the vertical direction of the image.

For example, in FIG. 13A, there are shown three steps of the focus operation of the lens 42 ranging from a non-focused state to a focused state in the case where the imaging system 10 shoots a pattern in which clear white area 410 and clear black area 412 are respectively arranged in the upper and lower portions of the screen. FIG. 13B illustrates for each focus step, a signal $\Sigma Yh$ obtained by accumulating the luminance signal Yh from the low-pass filter 100. In the case of a pattern such as the pattern above, when a difference D between the signals $\Sigma Yh$'s respectively accumulated for two neighboring horizontal scanning lines is computed by use of the difference circuit 128, the result D is obtained as illustrated in FIG. 13C. Effecting a peak hold operation on the signal of FIG. 13C in the peak hold circuit 400, there is developed a waveform as illustrated in FIG. 13D. By accumulating the waveform for a 1 V period, the output 13 delivers a signal representing an area of the shadow portion of FIG. 13D. As can be clearly seen from these figures, in a state where the lens 42 is appropriately set to a focused state, the area of the shadow portion similar to that illustrated in FIG. 13C takes the maximum value. As a consequence, the system controller 12 controls the focus of the lens 42 for the pattern described above such that the output 138 from the accumulator 136 develops the maximum value.

Figure 3B:
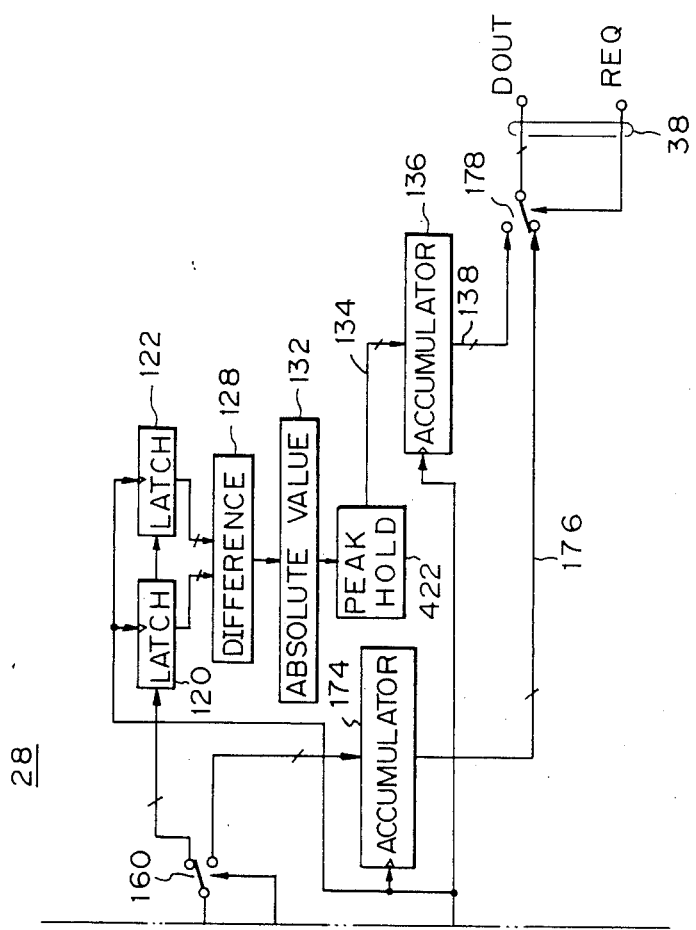

FIGS. 3A and 3B illustrate another example of the focus control circuit 28 in which the constituent components similar to those of FIG. 1 are assigned with the same reference numerals. In this configuration, a luminance signal 26 is supplied to another clamp circuit 150 such that a luminance signal Y is also delivered therefrom via a switch 152 to an analog-to-digital converter 108. The switch 152 alternatively selects either one of an output 110 from a clamp circuit 106 and an output 154 from the other clamp circuit 150, and thereby supplies the selected output to the analog-to-digital converter 108. In this configuration, the connection is ordinarily established through the connecting position 110 as illustrated in FIGS. 3A and 3B such that the connection is alternately switched between the connecting position 110 and the connecting position 154 in response to a clock CLK/n obtained by dividing the clock CLK by n (a natural number) in a demultiplier 156. As a consequence, a luminance signal Y for which the frequency band is not limited by a band-pass filter 100 for a pixel is delivered to the analog-to-digital converter 108 at an interval of n sampling clocks. In the remaining period of n−1 sampling clocks, a luminance signal for which the band pass is limited by the band-pass filter 100 is fed to the analog-to-digital converter 108.

As illustrated in FIGS. 3A and 3B, switches 158 and 160, which are similar to the switch 152 are respectively disposed between the analog-to-digital converter 108 and an accumulator 116 and between the accumulator 116 and a latch 120 of the first stage. For each period when the switches 152, 158, and 160 are set to the positions opposite to the positions illustrated in FIGS. 3A and 3B, namely, for each period of n sampling clocks, the luminance signal Y is once fed directly to the analog-to-digital converter 108 and to a latch 162 of the first stage. The latch 162 is similar to the latch 120 of the embodiment of FIG. 1, and such circuits related thereto as a latch 164 of the succeeding stage, a difference circuit 168, and an absolute value circuit 170 are configured so as to be similar to the latch 122, the difference circuit 128, and the absolute value circuit 132. The former elements vary from the latter components because the signal to be processed is not the high frequency luminance signal component Yh but the luminance signal data Y and the driving clock is a demultiplied clock CLK/n obtained from the demultiplier 156 so as to obtain a low frequency component of the luminance signal, and not the high frequency component.

The luminance signal data Y held in the latch 162 of the preceding stage is shifted to the succeeding latch 164 at the next sampling point, namely, when a period of n−1 sampling clocks is elapsed. The difference circuit 168 then computes the difference between the data respectively loaded in the latches 162 and 164 such that the resultant difference data is converted into data representing the absolute value thereof through the absolute value circuit 170 so as to be fed to a peak hold circuit 420. In the peak hold circuit 420, a maximum value of an input signal received from the absolute value circuit 170 is held for a predetermined period of time in an updating fashion. The predetermined period may also be set to a discretionary value. The peak hold circuit 420 has an output 172, which is delivered via the switch 158 to the accumulate circuit 116. By these circuits, data representing the absolute value obtained by effecting a peak hold operation on the difference in the data between the previous sampling point and the present sampling point is supplied from the output 172 of the peak hold circuit 420 to the accumulator 116 for a luminance signal associated with a horizontal scanning line.

Incidentally, when the switches 152 and 158 are at the connecting positions of FIGS. 3A and 3B, namely, in the period of n−1 sampling clocks, like in the case for the embodiment of FIG. 1, the high frequency luminance signal component Yh which has undergone a band pass limitation through the band-pass filter 100, is accumulated in the accumulator 116 for a 1 H period. In the case where the switches 152 and 158 are changed to the connecting positions opposite to the positions of FIGS. 3A and 3B, that is, for each period of n sampling clocks, the difference in the luminance signal between the previous sampling point and the current sampling point, namely, a variation in the low frequency component is supplied from the output 172 of the peakhold circuit 420 to the accumulator 116 so as to be added to the accumulated value held therein. The accumulator 116 effects in a timesharing fashion the accumulate operation which accumulates for a 1 H scanning period the high frequency luminance signal component Yh limited by the band-pass filter 100 and the accumulation to which accumulates for a 1 H scanning period the low frequency luminance component attained for each period of n sampling clocks. A signal obtained by accumulating the variation in the lower frequency component for a 1 H scanning period is inputted, while the switch 160 is at the position opposite to the position of FIGS. 3A and 3B, through the switch 160 to an accumulator 174 so as to be accumulated therein for a 1 V period. The accumulator 174 has an output 176, which is connected via a switch 178 to a data output line DOUT to the system controller 12.

The data of the high frequency luminance signal component Yh accumulated in the accumulator 116 is supplied, while the switch 160 is at the connecting position of FIGS. 3A and 3B, through the switch 160 to the latch 120 of the preceding stage. The preceding latch 120 and the succeeding latch 122 are supplied from an AND gate 130 with a horizontal synchronization signal HD only during a vertical scanning period associated with a predetermined focus detection area. As a consequence, by the latches 120 and 122 and a difference circuit 128, there is computed the difference in the high frequency component Yh accumulated for a 1 H scanning period between two neighboring horizontal scanning lines. The difference is then processed by an absolute value circuit 132 such that the obtained absolute value is fed to a peak hold circuit 422. Like the peak hold circuit 420, the peak hold circuit 422 also holds for a predetermined period of time a maximum value of an input signal received from the absolute value circuit 132 in an updating fashion. The predetermined period may also be set to a proper value. The peak hold circuit 422 has an output 134 to be supplied to an accumulate circuit 136 in which the received signal is accumulated for a 1 V scanning period and the result is delivered to an outut 138 thereof. The output 138 is connected via the switch 178 to the data output line DOUT to the system control circuit 12.

As can be seen from the description above, in the embodiment of FIGS. 3A and 3B, for a predetermined sampling area of a screen or a field, there is accumulated a variation in the low frequency component of the luminance signal associated with a horizontal scanning line. In addition, the accumulated data of the high frequency component Yh of the luminance signal for the 1 H scanning period is, on one side, processed so as to compute the difference thereof between two consecutive horizontal scanning lines such that the absolute value of the result is subjected to a peak hold operation and is then accumulated along the vertical scanning direction, and thereby attains the accumulated data at the output 138 of the accumualtor 136. That is, the output 38 of the accumualtor 136 develops accumulated difference data obtained by accumulating the absolute value, which undergoes the peak hold operation, of the difference between high frequency luminance signal components associated with two neighboring horizontal scanning lines in a predetermined sampling area of a field. Namely, the data includes a high frequency component related to the horizontal scanning operation and a component associated with the vertical scanning operation. On the other hand, the output 176 of the accumulator 174 delivers data obtained by accumulating in the vertical scanning direction the variation in the lower frequency component. These operations are conducted and the output is then reset for each field period.

The system controller 12 controls the switch 178 through a data request line REQ of a control line 38 so as to selectively read out the content of either one of the two accumulators 136 and 174 through the data output line DOUT. Since the read operation is effected in a selective fashion from a plurality of register circuits as described above, the system control circuit 12 needs to only include for the focus control an arithmetic logic circuit for one system.

As described above, according to the embodiment of FIGS. 3A and 3B, in addition to the high frequency luminacne signal component Yh limited by the band-pass filter 100, there is accumulated the variation in the luminance level obtained each time n samples are processed. As a consequence, also for an object field in which the gradation is smoothly changed in the horizontal scanning direction of the screen, the luminance signal component data accumulated in the accumulate circuit 174 presents a value dependent upon a change in the gradation. Consequently, when using the data of the accumulator 174, if the system controller 12 effects the focus control such that the data takes the maximum value, the imaging system 10 can be appropriately focused also on such an object. It is natural that also in this embodiment, the appropriate focus can be obtained, similar to the case in the embodiment of FIG. 1, for an object in which the gradation change takes place only in the vertical direction of the screen.

Figure 4:
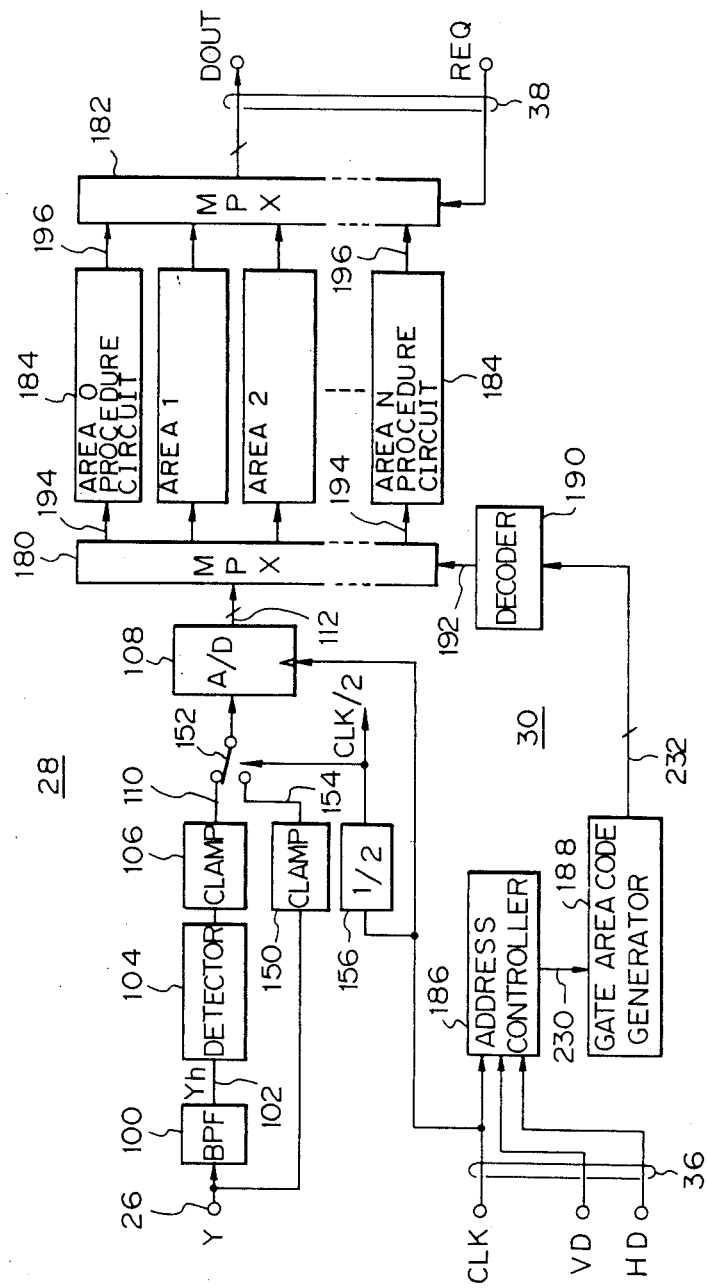
FIG. 4 is a functional block diagram similar to FIG. 1 illustrating an alternative embodiment according to the present invention.

In another configuration example of the focus control circuit 28 of FIG. 4, the focus control circuit 28 is provided with an arithmetic functional section or a procedure circuit 184 for generating data for an automatic iris control in addition to data for the focus control. The primary different points in the configuration between the embodiments of FIGS. 3A, 3B and 4 reside in that two multiplexers, MPX's 180 and 182 and an N-circuit procedure circuit 184 are arranged between an output 112 of an analog-to-digital converter 108 and a focus control data output 38. In this example, N is a natural number and is equal to the number of sampling areas 302 as illustrated in FIG. 6 to be employed for a detection of the focused state and for a light measurement in the overall area of a screen 300 displayed with the video signal. In the example of FIG. 6, there are disposed six sampling areas 302, namely, areas #0 to #5.

According to the embodiment of FIG. 4, it is also greatly different from the preceding embodiments because a gate signal generate functional section defining the sampling area 302 includes an address control circuit 186, a gate area code generator 188, and a decoder 190. In this embodiment, the gate signal generate section is advantageously mounted in a portion of an integrated circuit of the timing generator of FIG. 2. Furthermore, a switch 152 disposed on the input side of the analog-to-digital converter 108 is responsive to a demultiplier 156, which is slightly different from the demultiplier of the embodiment of FIGS. 3A and 3B, namely, the value of the demultiplication factor is set as $\frac{1}{2}$. As a consequence, the switch 152 operates in response to a demultiplied clock CLK/2. As illustrated in FIGS. 8A and 8B, so as to alternately select either one of the connecting positions 110 and 154 for each pixel period.

The multiplexer 180 on the input side is responsive to an output 192 from the decoder 190 so as to alternatively connect an input 112 from the analog-to-digital converter 108 to an input 194 of either one of the procedure circuits 184. In addition, the multiplexer 182 on the ouptut side is a selector circuit which is responsive to a data request REQ on a connecting line 38 from the system controller 12 so as to deliver an output 196 from either one of the procedure circuits 184 to a data output DOUT.

Each procedure circuit 184 of which a particular constitution example is illustrated in FIG. 5 also includes a switch 200 responsive to the demultiplied clock CLK/2. The switch 200 synchronously operates with the switch 152 so as to alternately take either one of the connecting positions 202 and 204 for each sample period of the analog-to-digital conversion. As a consequence, an accumulator 206 is supplied with a high frequency luminance signal component Yh of which the frequency band is limited by the band-pass filter 100. Whereas, another accumualtor 208 is directly loaded with a luminance signal Y from an input 26 of a focus control circuit 28. The luminance signal Y from the input 26 is also fed to a maximum value detector 210 and a minimum value detector 212.

Incidentally, when the system is configured such that the circuit configuration includes the analog-to-digital converter 108 for each of the high frequency luminance signal Yh and the luminance signal Y and the multiplexer 180 includes channels for both signals, the switches 152 and 200 become unnecessary. Consequently, the high frequency luminance signal Yh and the luminance signal Y needs to only be directly supplied from the respective analog-to-digital converters 108 to the connecting lines 202 and 204, respectively.

The accumulator circuit 206 accumulates the high frequency luminance signal component data Yh for the area 302 associated with the procedure circuit 184. Accumulated value data $\Sigma H$ is delivered via a buffer 207 in synchronism with the vertical synchronization signal VD to the multiplexer 182 so as to be used for the focus control in the system contol circuit 12.

The accumulator 208 accumulates the luminance signal data Y for the area 302 associated with the procedure circuit 184. Accumulated value data $\Sigma Y$ is delivered also via a buffer 209 in synchronism with the vertical synchronization signal VD to the multiplexer 182 so as to be used for the iris control in the system contol circuit 12. The accumulated value output $\Sigma Y$ from the accumulator 208 is also supplied to a difference circuit 220, which is a circuit responsive to a horizontal blanking signal HBLK so as to obtain a difference D in the accumulated value for the area 302 of the screen between the previous horizontal scanning period and the current horizontal scanning period. The difference value D is delivered to a peak hold circuit 424. In the peak hold circuit 424, a maximum value of an input signal from the difference circuit 220 is held for a predetermined period of time in an updating fashion. The predetermined period may be set to an appropriate value. The peak hold circuit 424 supplies an output to an input of an accumulator 222, which operates in response to the horizontal blanking signal HBLK so as to accumulate for a 1 V period the peak hold value of the difference D with respect to the area 302. The accumulated data represented as $\Sigma D$ for convenience is fed via a buffer 223 to the system controller 12 so as to be employed therein to effect a focus control for the component of the vertical direction.

The maximum value detector 210 detects a maximum value in a horizontal scanning line for the area 302 associated with the procedure circuit 184. The minimum value detector 212 is disposed to detect a minimum value in a horizontal scanning line for the same area 302. A difference circuit 214 is connected to the outputs of the maximum value detector 210 and the minimum value detector 212, respectively. In the difference circuit 214, the maximum value obtained in the horizontal scanning effected on the area 302 is received from the maximum value detector 210 and the minimum value in the same horizontal scanning is attained from the minimum value detector 212, and thereby computes a difference L therebetween in response to a horizontal blanking signal HBLK. The difference data L is accumulated for the area 302 in an accumulate circuit 216 for a 1 V period. Resultant accumulated data $\Sigma L$ is also supplied via a buffer 218 to the multiplexer 182 in synchronism with a vertical synchronization signal VD so as to be used for the focus control in the system controller 12.

In the N-circuit procedure circuit unit 184, at a timing synchronized with the video signal scanning, either one of the circuits 184 associated with the area 302 being scanned is selected by the multiplexer 180 on the input side so as to conduct arithmetic operations on the high frequency luminance signal component Yh and the luminance signal Y. The selection is accomplished in response to the control signal 192 from the decoder 190.

The gate area code generator 188 is a code generate circuit including, for example, a read-only memory, ROM or a gate array for generating a gate area code specifying a particular area in the area of the screen 300. For example, in the case of a ROM for a screen area configuration of FIG. 6, as illustrated in FIG. 7, codes 0 to 5 uniquely defining the area 302 including sampling points identified by rows and columns are stored at the respective storage addresses.

As described above, in the gate area code generator 188 of this embodiment, by desirably programming a ROM or a gate array, it is possible to generate a gate signal defining the area 302 having an arbitrary shape. In addition, the precision of the area depends on the storage capacity of the ROM or gate array adopted for the generator 188. In the example of FIG. 6, the screen 300 is subdivided into six partitions such that each partitioned area 302 is represented with three bits.

The address control circuit 186 is a counter for generating an address of the gate area code generator 188 at a timing synchronized with the scanning of the area 302 of the screen 300. Where the address indicates a gate area code specifying the particular area 302. The address controller 186 stepwise increases the value of the address in response to the clock CLK from the timing generator 30 and the synchronization signals VD and HD so as to supply the resultant address via an address line 230 to the code generator 188. During the horizontal blanking period HBLK, the address controller 186 stops the stepwise address operation and is reset by the vertical synchronization signal VD.

The code generate cicuit 188 reads a gate area code from a storage location specified by the address and then feeds the code via an output 232 to the decoder 190. The gate area code includes, for example, one byte in this embodiment. The decoder 190 develops the gate area code so as to open a gate associated therewith of the multiplexer 180. As a result, at a timing of the scanning for the screen 300, either one of the procedure circuits 184 related to the area 302 being scanned is connected via the multiplexer 180 to the analog-to-digital converter 108.

In the scanning of a row 0 of the screen 300 in FIG. 6, there is produced a gate area code "2" for columns 0 to 5 and hence the multiplexer 180 selects a procedure 184 associated with an area 2. During this operation, the procedure circuit 184 of the area 2 accumulates, as can be seen from the timing chart of FIGS. 8A and 8B, the high frequency luminance signal component Yh by the accumulator 206 and the luminance signal Y by use of the accumulator 208 such that the maximum value detector 210 and the minimum value detector 212 respectively detect the maximum value and the minimum value of the luminance signal. In the difference circuit 214, the maximum and minimum values developed in the horizontal scanning are respectively attained from the maximum value detector 210 and the minimum value detector 212, and thereby computing the difference L therebetween. The difference data L is accumulated for the area 2 by the accumulator 216 for a 1 V period.

In a similar fashion, through the scanning of the row 0 in the screen 300 ranging from column 6 to column 11, a gate area code "3" is produced such that the multiplexer 180 selects a procedure circuit 184 associated with the area 3 so as to achieve the similar operation. This is also the case for the next row 2, for example, in a procedure circuit 184 selected in association with the area 2, the difference circuit 220 computes a difference D between the accumulated value of the luminance signal Y in the accumulator 208 associated with the pertinent horizontal scanning and the valve of the luminance signal Y related to the previous horizontal scanning period in response to the horizontal blanking signal HBLK. The difference D is accumulated by the accumulator 222 for a 1 V period.

Figure 9B:
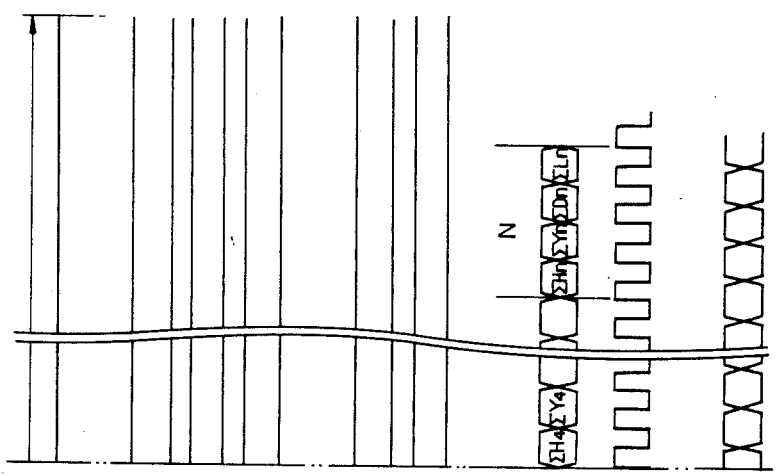
Figure 10:
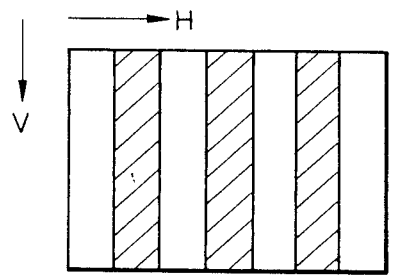
Figure 10:
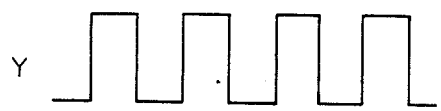
Figure 10:
Figure 10:
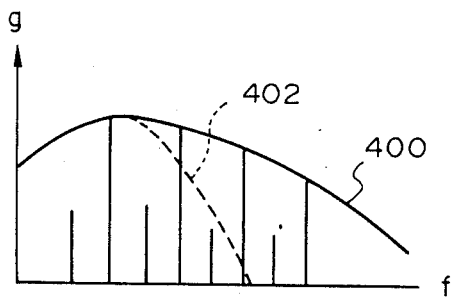

In this fashion, the respective procedure circuits 184 independently conduct the arithmetic operations for the 1 V period, and thereby obtain resultant arithmetic data for the overall area 302 of the screen 300. Thereafter, as illustrates in FIGS. 9A and 9B, in the subsequent vertical blanking period VBLK, the system control circuit 12 supplies the data request REQ to the desired multiplexer 182 such that the resultant data is fed to the system controller 12 from a procedure circuit 184 specified in response thereto. The system controller 12 consequently can attain multidata related to the focus control and to the light measurement from all of the procedure circuits 184.

Using the focus control data and light measurement data 38, the system control circuit 12 controls the focus of the imaging lens 42 such that the focus control data develops a maximum value and effects a control of the iris 44 depending on the light measurement data 38.

In this embodiment, with respect to the processing of an area 302, the control operation is found to be similar to the operation in FIGS. 3A and 3B. However, there exist differrent points when compared with the embodiment of FIGS. 3A and 3B such that there is provided the circuit 208 to directly accumulate the luminance signal Y and, in contrast with the operation of the embodiment of FIGS. 3A and 3B in which the difference between samples is always computed for a low frequency component, the maximum and minimum values in the area are respectively retained in a process sampling the luminance signal so as to accumulate the difference therebetween for each area 302.

Figure 11A:
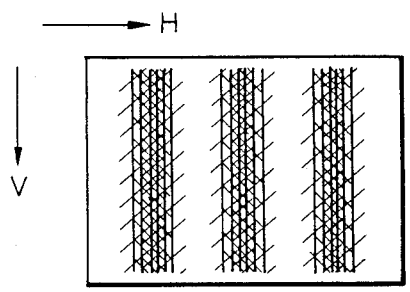
Figure 11B:
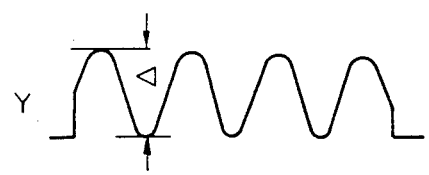
Figure 11C:
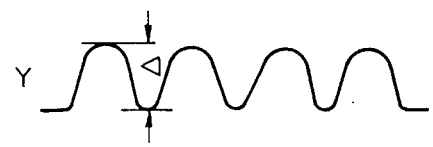
Figure 11D:
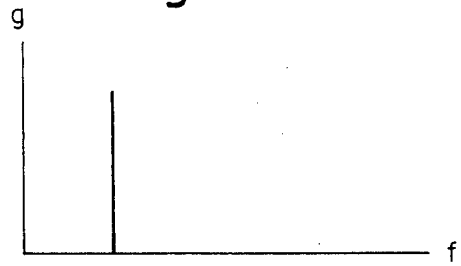

The accumulated value $\Sigma$ L in the accumulator 214 takes the maximum value when the imaging system 10 is focused on an object in which the gradation smoothly varies in the horizontal direction, for example, as illustrated in FIG. 11A. For such an object, in a non-focused state, there appears a small difference $\Delta$ between the maximum and minimum values in a horizontal scanning period as shown in FIG. 11C. Whereas in the focused state, the difference $\Delta$ becomes greater as illustrated in FIG. 11B. In this embodiment, the difference circuit 214 computes the difference L between the maximum and minimum vlaues of the luminance in a horizontal scanning period and then the accumulator 216 accumulates the difference L along the vertical scanning direction so as to conduct the focus control by use of the accumulated value $\Sigma$ L, and thereby guarantees the focus control for an image of an object as illustrated in FIG. 11A.

Figure 12A:
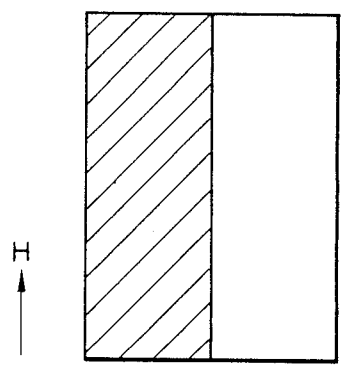
Figure 12B:
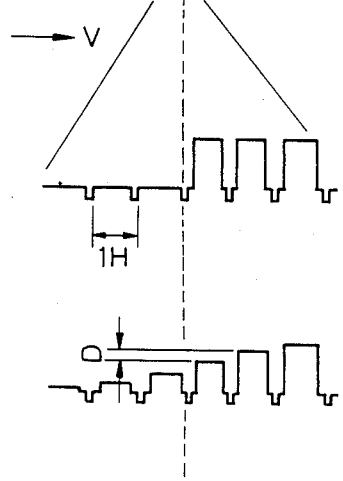
Figure 12C:
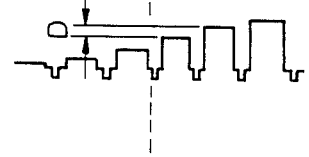

In addition, for an object image similar to the object illustrated in FIG. 12A, the accumulated value $\Sigma$ D in the accumualtor 222 takes the maximum value in the focused state. For such an object, in the non-focused state, the luminance level gradually varies through a sequence of horizontal scanning periods as illustrated in FIG. 12C. Whereas in the focused state, the luminance level abruptly changes as illustrated in FIG. 12B. In this embodiment, the difference circuit 220 computes the difference D in the accumulated luminance value between the previous horizontal scanning period and the present horizontal scanning period and then the peak hold circuit 424 holds a peak value thereof for a predetermined period of time such that the accumulator 222 accumulates the difference D along the vertical scanning direction so as to conduct the focus control by use of the accumulated value $\Sigma$ D, and thereby guarantees the focus control for an image of an object as illustrated in FIG. 12A.

Furthermore, since the accumulation in the 1 H period is achieved in the horizontal blanking period HBLK, there requires only one arithmetic logic circuit as a common unit. Since the read operation to supply the data to the system controller 12 is conducted in the vertical blanking period VBLK, there are obtained in the 1 V period for each area 302 the accumulated value of the high frequency component Yh, the accumulated value of the luminance component Y, and the accumulated value of the difference therebetween. As a consequence, for the focus control, there is developed a high focusing accuracy not only for an image in which the luminance greatly changes in the horizontal direction of the image but also for an image associated with a large change in the luminance only in the vertical direction thereof. Moreover, there is also attained light measurement data suitable for the automatic exposure control.

According to the present invention, the maximum value of the difference in the high frequency signal component of a video signal held at least for a portion of a vertical scanning period is accumulated along the vertical scanning direction of the screen such that the focus control is effected so as to take the maximum value of the accumulated value. As a consequence, an efficient focus control is also conducted for an object in which the luminance change takes place only in the vertical direction of the screen. The focus control method is advantageously applied to digital processing.

While the present invention has been described with reference to the particular illustrative embodiments, the present invention is not to be restricted by those embodiments but only by the appended claims. It is to be appreciated that those skilled in the art can change or modify the embodiments without departing from the scope and spirit of the present invention.

What is claimed is:

1. A focus control apparatus of a camera for attaining a video signal representing an object field shot through a lens, comprising:
    filter means for extracting a luminance signal component having a relatively high frequency from the video signal;
    first accumulating means for accumulating the extracted luminance signal component with respect to a horizontal scanning line of the video signal:
    differentiating means for attaining a difference in the accumulated luminance signal component between two horizontal scanning lines;
    second accumulating means for accumulating the difference having a maximum value developed at least in a portion of a vertical scanning period of the video signal which is held for a predetermined period of time; and
    control means for producing a control signal which controls the focus of the lens such that the accumulated value supplied from said second accumulating means becomes a maximum value.

2. A focus control apparatus in accordance with claim 1 further comprising:
    third accumulating means for accumulating at least in a portion of the vertical scanning period the luminance signal component accumulated by said first accumulating means; and
    adding means for effecting an addition on accumulated values produced from said second and third accumulating means with each other;
    said control means producing the control signal such that a value produced from said adding means becomes a maximum value.

3. A focus control apparatus in accordance with claim 1 further comprising timing generating means for operating said first accumulating means in a predetermined portion of the horizontal scanning period of the video signal and for operating said second accumulating means and said differentiating means in a predetermined portion of the vertical scanning period of the video signal.

4. A focus control apparatus in accordance with claim 2 further comprising timing generating means for operating said first accumulating means in a predetermined portion of the horizontal scanning period of the video signal and for operating said second and third accumulating means and said differentiating means in a predetermined portion of the vertical scanning period of the video signal.

5. A focus control apparatus in accordance with claim 1 comprising:
    imaging means having said lens for imaging the object therethrough to generate the video signal, and thereby supplying the video signal to said filter means; and
    focusing means for focusing said lens of said imaging means in response to the control signal.

6. A focus control apparatus of a camera for attaining a video signal representing an object field shot through a lens, comprising:
    filter means for extracting a luminance signal component having a relatively high frequency from the video signal;
    difference accumulating means for accumulating the extracted luminance signal component for a horizontal scanning line of the video signal so as to attain a difference in the accumulated value between two horizontal scanning lines;
    first accumulating means for accumulating the difference having a maximum value developed at least in a portion of a vertical scanning period of the video signal which is held for a predetermined period of time;
    second accumulating means for extracting a luminance signal component having a relatively low frequency so as to accumulate a maximum value of a variation on the extracted component, the maximum value being held for a predetermined period of time; and
    control means for producing a control signal which controls the focus of the lens such that the accumulated value supplied from said second accumulating means becomes a maximum value.

7. A focus control apparatus in accordance with claim 6 further comprising:
    third accumulating means for accumulating at least in a portion of the vertical scanning period a difference developed in an accumulated value of the high frequency luminance signal component; and
    selective output means operative under the control of said control means for selectively supplying accumulated values respectively accumulated in said second and third accumulating means to said control means.

8. A focus control apparatus of a camera for attaining a video signal representing an object field shot through a lens, comprising;

filter means for extracting a luminance signal component having a relatively high frequency from the video signal;

timing generating means for generating at a timing synchronized with a scanning of the video signal a control signal specifying a particular area of a screen represented by the video signal;

arithmetic means disposed in association with the particular area for accumulating for the associated particular area the luminance signal component with respect to a horixontal scanning line of the video signal so as to accumulate with respect to a vertical scanning operation a difference between a maximum value and a maximum value of the luminance signal in the horizontal scanning line;

selecting means responsive to the control signal for selectively inputting the luminance signal component to said arithmetic means associated with the predetermined area specified by the control signal; and control means for producing a control signal which controls the focus of the lens such that the accumulated value supplied from said arithmetic means becomes a maximum value.

9. A focus control apparatus in accordance with claim 8 further comprising;

imaging means for adjusting an amount of an exposure and shooting the object field which generates a video signal so as to deliver the video signal to said filter means and to said select means, said arithmetic means including accumulating means for accumulating, for the associated particular area, a luminance signal of the video signal with respect to a horizontal scanning line of the video signal, said control means controlling the amount of the exposure of the imaging means in response to an accumulated value supplied from said accumulating means.

10. A focus control apparatus in accordance with claim 8 further comprising selective outputting means operative under the control of said control means for selectively supplying the accumulated values accumulated in said arithemetic means to said control means.

11. A method for focus controlling in a camera which attains a video signal representing an object field shot through a lens, comprising the steps of:

(a) extracting a luminance signal component having a relatively high frequency from the video signal;

(b) accumulating the extracted luminance signal component with respect to a horizontal scanning line of the video signal;

(c) attaining a difference in the accumulated luminance signal component between two horizontal scanning lines;

(d) accumulating the difference having a maximum value developed at least in a portion of a vertical scanning period of the video signal which is held for a predetermined period of time; and (e) producing a control signal which controls the focus of the lens such that the accumulated value from said step (d) becomes a maximum value.

12. A method in accordance with claim 11, further comprising the steps of:

(f) accumulating at least in a portion of the vertical scanning period the luminance signal component accumulated at said step (b); and (g) adding on accumulated values developed at said steps (d) and (f) with each other;

wherein said step (e) produces the control signal such that a value produced at said step (g) becomes a maximum value.

13. A method in accordance with claim 11, further comprising the steps of:

(h) operating said step (b) in a predetermined portion of the horizontal scanning period of the video signal; and (i) operating said steps (c) and (d) in a predetermined portion of the vertical scanning period of the video signal.

14. A method in accordance with claim 12, further comprising the steps of:

(j) operating said step (b) in a predetermined portion of the horizontal scanning period of the video signal; and (k) operating said steps (c), (d) and (f) in a predetermined portion of the vertical scanning period of the video signal.

15. A method in accordance with claim 11, further comprising the steps of:

(l) imaging the object through said lens for generating the video signal and thereby supplying the video signal at said step (a); and (m) focusing said lens at said step (l) in response to the control signal.

* * * * *